Figure 1:
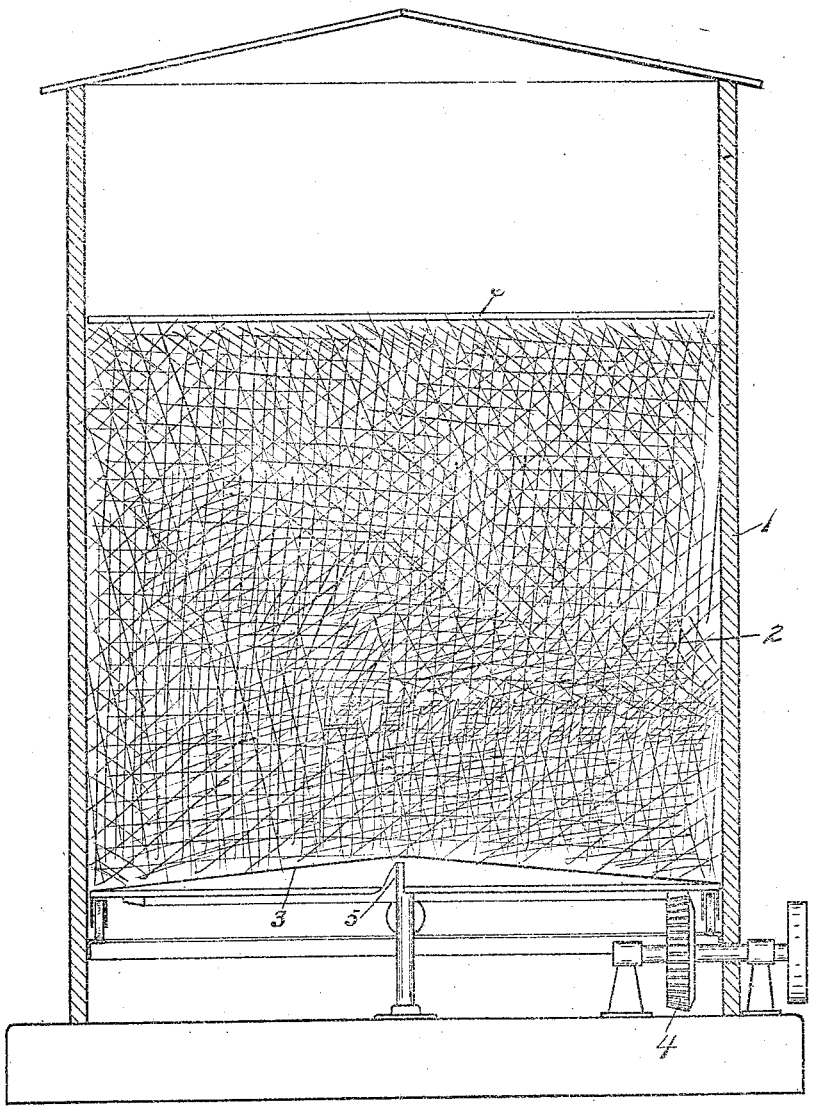

R. T. HOSKING.
METHOD OF STORING AND REMOVING SILAGE.
APPLICATION FILED FEB. 9, 1914.

1,150,119.

Patented Aug. 17, 1915.
2 SHEETS—SHEET 1.

R. T. HOSKING.
METHOD OF STORING AND REMOVING SILAGE.
APPLICATION FILED FEB. 9, 1914.

1,150,119.

Patented Aug. 17, 1915.
2 SHEETS—SHEET 2.

WITNESSES:
Nellie M. Angus.
Joseph J. Carpenter.

Richard T. Hosking INVENTOR

BY
Geo. B. Willcox ATTORNEY

UNITED STATES PATENT OFFICE.

RICHARD T. HOSKING, OF SAGINAW, MICHIGAN.

METHOD OF STORING AND REMOVING SILAGE.

1,150,119.  Specification of Letters Patent.  Patented Aug. 17, 1915.

Application filed February 9, 1914.  Serial No. 817,575.

*To all whom it may concern:*

Be it known that I, RICHARD T. HOSKING, a citizen of the United States, residing at Saginaw, in the county of Saginaw and State of Michigan, have invented certain new and useful Improvements in Methods of Storing and Removing Silage; and I do hereby declare the following to be a full, clear, and exact description of the invention, such as will enable others skilled in the art to which it appertains to make and use the same.

This invention relates to the use of silos and pertains more particularly to a method of storing and removing ensilage commonly called silage.

The objects of my improvements are, first, to provide a method by which silage can be gradually removed from the silo, while keeping the upper part of the silo closed and exposing a minimum amount of the stored silage to the action of the air.

Another object is to facilitate the removal of the completely fermented or cured silage, making practicable the refilling, at any time, of a silo that has been partly emptied, without having to feed the cattle from the refilled portion before the fermentation period is completed.

A further object is to remove the silage from below without stirring, breaking or otherwise disturbing the mass, thereby preventing access of air up through the mass and spoiling or deteriorating the silage.

A further object is to provide a method by which to make possible the employment of silos of relatively large diameter and low height, enabling the user to remove the quantity of silage necessary for the varying feed requirements without loss of silage due to exposure of any considerable area of the mass to the air.

An important object is the reduction of the wall space per ton capacity; because heat and the exclusion of air are necessary for the production of good silage, the reduction of wall space per ton capacity minimizes the losses of silage caused by the passage of air into the silo through porous walls; and the reduction of wall space also reduces the loss of heat by conductivity through the walls. The intaking of air through porous walls causes the decaying of silage and the loss of heat by conduction checks the desired fermentation and if sufficiently aggravated results in the freezing of the silage.

A further object is to obviate the danger and inconvenience of climbing to the top level of the silage at each feeding period.

Another advantage inherent in my method, which makes possible the constructing of silos of comparatively large diameter and low height, is that the stability and strength of silos so constructed are greatly increased.

These objects and certain others which will appear later in the specification are obtained by my improved method, the operation of which, together with one means for carrying out the method will now be explained.

It is well known in the art of storing and feeding silage that the mass, after being closed in the silo for about six weeks, will have passed through the stages of settling, heating and fermenting, after which it is suitable for feeding as silage.

The usual method has many serious disadvantages, and it is the general object of my present method to overcome these objections and to bring forth a system of silage-handling that is more economical and more certain to deliver a uniform product without waste, and with a minimum of labor.

In the former method, it has been customary to put the silage into a silo having a door-way extending from top to bottom, through which to remove the material from above as wanted. The upper surface of the mass, is therefore, continually exposed to the action of the air. After twenty-four hours, or thereabout, silage that has been exposed to the air becomes spoiled for food. It is, therefore, necessary in the former method that the amount required for the daily feeding be removed each day from the top of the mass in a layer of approximately uniform thickness throughout the entire area of the top. If this is not done, the top of the mass, remaining exposed to the air for a longer period than twenty-four hours, will spoil and, therefore, be wasted.

Another disadvantage of removing silage from the top as above described is that the quantity of silage that must be removed per day is practically fixed, regardless of the varying feeding requirements. For example, a silo sixteen feet in diameter will feed a herd of thirty cows if a layer of approximately two inches of silage is taken from the top of the mass each day. It is found in practice that unless this amount is removed, the silage at the top of the mass will spoil. Similarly, a silo ten feet in diameter will feed a herd of eight cows, allowing a removal of two inches per day. Now, if a silo operated by the former method is installed for a herd of thirty cows, and if during the feeding season the herd is reduced, to say, eight cows, a great portion of the contents of the sixteen-foot silo must become deteriorated on account of exposure to the air. To overcome this serious disadvantage of the former method it has sometimes been the practice to install a number of small silos instead of a single large one, but the cost in such cases is much greater.

Another disadvantage of the former method is that the newest silage, which is at the top of the mass, is the first to be removed, whereas better results are secured if the oldest silage is removed first.

It is to be borne in mind that silage exposed to the air for twenty-four hours, or thereabout, will become spoiled and it is, therefore, necessary to protect the surface of the mass of silage from the action of the air as much as possible.

To overcome the difficulties and disadvantages of the former system of storing and removing silage, I have devised my improved system, which consists in filling the silo, allowing it to stand until the fermenting and heating process is completed, and then progressively removing the silage from the bottom of the mass in a layer of substantially uniform thickness throughout the entire cross sectional area of the silo. While so doing, I protect the bottom surface of the mass from such contact with air as would cause minimum deterioration of the silage at the new surface of the mass.

My improved method can be carried out in a number of ways, and it is to be understood that I do not desire to limit the application of my invention to any one mechanism for producing, storing or removing the silage, but for purpose of illustrating and describing my improved method, I have selected one embodiment of such devices, which is shown in the accompanying drawings.

Figure 2:
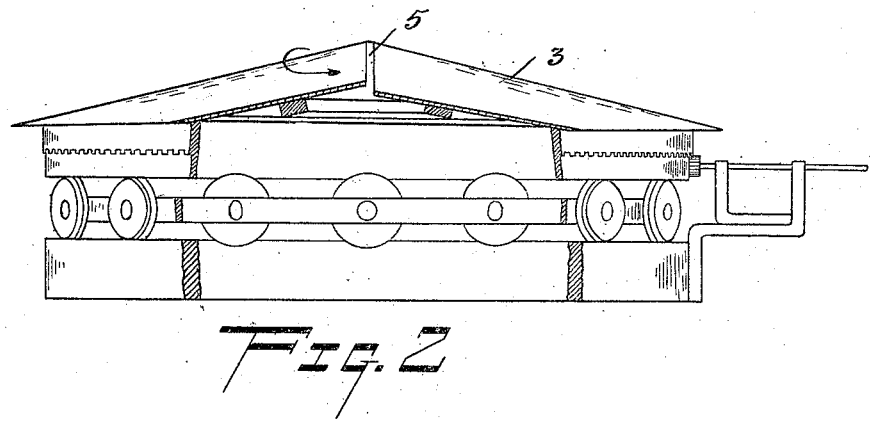
Figure 3:
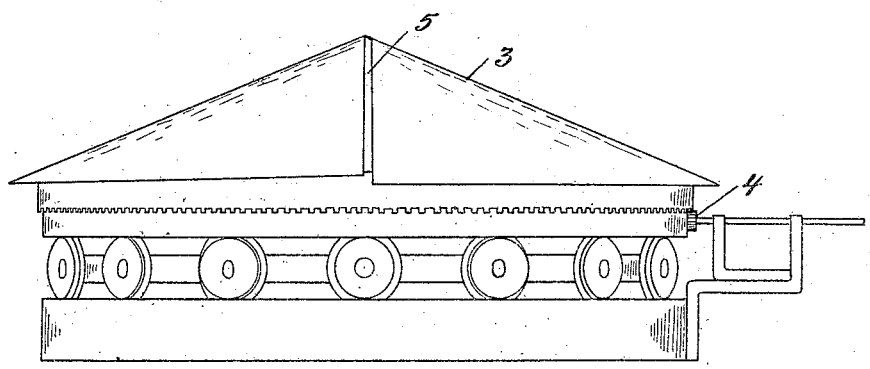

Figure 1 is a vertical section of a silo adapted to operate in accordance with my improvement. Fig. 2 is a part sectional side elevation of the revoluble interior bottom and the mechanism by which it is operated. Fig. 3 is a side elevation of the same.

1 represents the body of the silo.
2 is the mass of silage.
3 is a suitable revoluble interior bottom on which the mass of silage rests.
4 are gears by which the revoluble bottom may be rotated about its central axis, any suitable means being employed for operating the gears.

5 is a suitable slot or opening in the revoluble bottom through which a portion of the silage may be removed from the bottom of the mass while the revoluble bottom is being turned by means of the gears.

The revoluble bottom may be in the form of a platform having one or more radial slits therein, or it may be of any other construction so long as it fulfils the essential requirements that the bottom of the mass of silage shall not be exposed to the action of the air to any great extent.

The silage is removed through the slot, either by scraping, raking, shearing, or in any other suitable manner, while the bottom is being revolved and is preferably automatically sheared from the bottom of the mass by the cutting action of the advancing edge of the slot 5, the severed silage dropping through the slot into the space beneath the revoluble bottom 3, whence it can be removed by hand. It is evident that no part of the silage is exposed to the action of the air, except that small part immediately adjacent the slot. As the silage is removed from the bottom, the mass settles as a solid body or column, the interior of the mass remaining intact and not being stirred or displaced so that air can get into it.

It is one of the important functions of my improvement to enable the removal of the silage at any desired rate to suit various rates of feeding without at any time exposing any considerable area of the mass to the action of the air and without disturbing the mass while it is being gradually removed for feeding purposes.

Any suitable loose cover, as indicated at 6, may be used to exclude the air from the upper surface of the mass. Such a cover prevents to a considerable extent the spoiling of the upper surface of the mass. It is possible, however, to omit the cover and allow the silage to spoil for a depth of, say, six inches, to form an air seal.

By the above method, a minimum surface of the mass of silage is exposed to the action of the air. It is possible to feed down the silage as fast or slow as it is needed for varying numbers of animals to be fed. A silo of standard size is by this system adapted to almost any requirements within its maximum storage capacity, because the excluding of the air both during the time of storage and during the removal of the material makes it possible to preserve the silage unspoiled for even two years or more, if necessary. Silos of relatively large diameter and low height possess increased stability and strength and my be located so as to be protected in the lee of a barn or other structure instead of necessitating the building of a very high silo of small diameter as has heretofore been the practice, in order to meet the feeding requirements previously discussed. High silos projecting above the roofs of adjacent structures have long been recognized as being liable to damage from wind storms. By this method it is made possible to so construct the silos that the liability of damage by wind is minimized.

Having thus described my invention, what I claim and desire to secure by Letters Patent is:

1. The herein-described method of storing and removing silage which consists in depositing suitable material into a silo, allowing the contents to stand until cured, and progressively removing from the bottom of the mass a relatively thin layer of silage while protecting the new surface of said mass from direct contact with the atmosphere.

2. The herein-described method of storing and removing silage, which consists in depositing suitable material into a silo, allowing the contents to stand until cured, and progressively removing from the bottom of the mass a relatively thin layer of silage while protecting the bottom of said mass from the air, the area of said layer being substantially equal to the area of the bottom of said mass.

3. The herein-described method of storing and removing silage, which consists in filling a silo, allowing the contents to stand until cured, and progressively removing the bottom of the mass.

In testimony whereof, I affix my signature in presence of two witnesses.

RICHARD T. HOSKING.

Witnesses:
　NELLIE M. ANGUS,
　FRANK L. MARTINDALE.

Copies of this patent may be obtained for five cents each, by addressing the "Commissioner of Patents Washington, D. C."